(No Model.)
G. BEEKMAN.
DEVICE FOR PICKING COTTON.
No. 332,865. Patented Dec. 22, 1885.
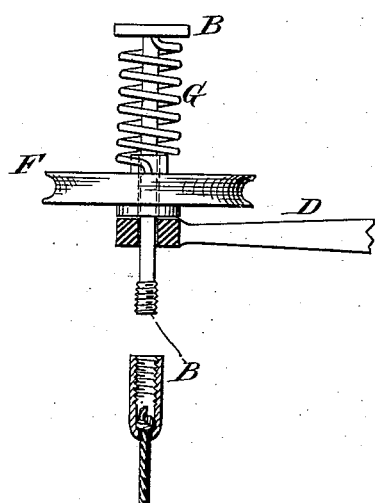
Fig. 1.
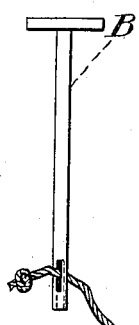
Fig. 2.
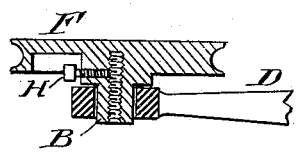
Fig. 3.
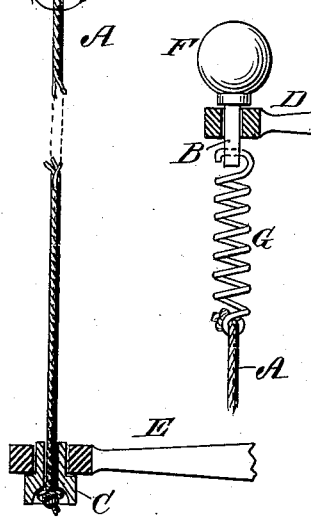
Fig. 4.
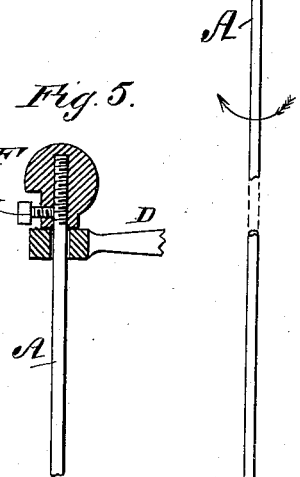
Fig. 5.
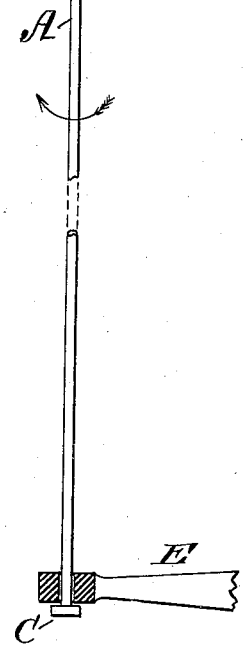
Witnesses.
H. F. Parker.
Thomas Hunt.
Inventor.
Gerard Beekman
by C. Wyllys Betts
Attorney.

UNITED STATES PATENT OFFICE.

GERARD BEEKMAN, OF NEW YORK, N. Y.

DEVICE FOR PICKING COTTON.

SPECIFICATION forming part of Letters Patent No. 332,865, dated December 22, 1885.

Application filed March 19, 1885. Serial No. 159,498. (No model.)

*To all whom it may concern:*

Be it known that I, GERARD BEEKMAN, a citizen of the United States, residing in New York, county of New York, and State of New York, have invented a new and useful Device for Picking Cotton, for use in a cotton-harvester, of which the following is a specification.

My invention relates to improvements in the class of cotton-harvesters in which the picking devices are carried backward through the machine, in contact with the plant, at substantially the same rate of motion as that of the machine over the ground, thus remaining in contact with the cotton-bolls with the minimum friction.

The objects of my improvements are, first, to provide a cheap and light device for drawing the cotton from the bolls; second, to diminish the friction on the plant. I attain these objects by the mechanism illustrated in the accompanying drawings, in which—

Figure 1 represents part of the frame of an orrery picking device, such as is described in the Letters Patent granted to me March 3, 1885, No. 313,276, with my improved picking device attached. Fig. 2 shows an alternate form of shank for holding the pickers. Fig. 3 represents in section another form with a wire picker; Fig. 4, another form of shank and device for rotating the same. Fig. 5 represents in section still another form.

The principle upon which these pickers operate is not to extract the cotton by means of picking-points, as in my former Letters Patent, but to extract it by means of a twist of the fine fibers of cotton around the picker, by means of which at each revolution of the picker the hold upon the cotton is increased by the wrap of the cotton about the picker and upon itself.

My improved picking device consists of a series of cords or wires, A, preferably arranged as are the separate pickers in the orrery system, shown in my said Patent No. 313,276, but closer together and more numerous, and with a more rapid separate rotation given to each picker than is there shown. These cords or wires must be sufficiently rough to take hold of the small fibers of cotton, and sufficiently small to quickly wrap the small fibers around them, and thus obtain a constantly-increasing pull upon the cotton of a boll. It has been found that a cord of rough or fibrous substance, or a wire covered with such substance, or with a roughened surface, will take sufficient hold of these small cotton fibers; and it has been found that a cord about one-eighth of an inch in diameter, or a wire of even less diameter and quickly revolved, will wrap the fibers around it and give sufficient pull to extract the cotton.

These pickers of cord or wire can be more easily cleaned than the picking-points heretofore used, both because their surface is comparatively smooth and because their diameter is small, and because there is no disadvantage in leaving upon the pickers a small part of the cotton extracted, this forming a new picking-surface equally effective for entangling the small fibers. The cords or wires may be attached at the upper end only to the shank B, and allowed to hang loosely; but they are preferably attached at each end to suitable shanks, B C, having their bearings in the frame D E, and capable of revolving therein. To one or both of these shanks B C is attached a pinion, or pulley, or ball, F, by means of which the picker is rotated. In case a cord is used, it may be attached to the shaft B of the pulley or ball F in any suitable manner. In Fig. 1 the end is knotted in the hollow shaft B of the pulley F, so as to give it a central bearing. If this method is used, the opening in the hollow shaft should be made triangular, or of irregular shape, to prevent the knot from turning in the shaft, and the same irregular opening may be made in the opposite hollow shaft, C. In case the lower end is left loose, when a cord is used, it should be weighted. When the cord is attached to the lower shank, C, as well as to the upper shank, B, the pulley or ball F may be attached to the shank B by means of a spiral spring, G, Fig. 1, which coils around the shaft of the shank B and regulates the tension on the cord A; or the cord may be attached to the spring, as shown in Fig. 4, and the spring take the place of the shank. The twisting action of the cord A, by means of this pinion, or pulley, or ball F, in connection with the spring G, will always give it sufficient tension. These springs may be omitted when wires are used, the wire being attached directly to the shaft of the pulley or ball F, as shown in Figs. 3 and 5, and the proper tension being given by screwing the wire up more or less into the ball, or into the shaft of the pinion or pulley, and it may be prevented from unscrewing by a set-screw, H, Figs. 2 and 5, or any suitable device. At its opposite end a head may be formed upon the wire, instead of the shank C. Fig. 2 represents a simpler form of attaching the cord to the shank B by threading or passing it through an eye. When this method is used, the side of the shaft B opposite to the knot should be grooved to receive the cord, thus giving it a central bearing. The shank or head C at the lower end should be so set in its bearing that it will readily turn by means of the twisting action of the picker. When the picker, whether attached at the upper end only or at both ends, has by its twisting action extracted the cotton, it can be cleaned either by the cleaning-rollers shown in the Letters Patent granted to me March 3, 1885, No. 313,278, or in any suitable manner.

What I claim, and desire to secure by Letters Patent, is—

1. In a machine for harvesting cotton, picking devices consisting of one or more cords or wires and means for rotating them upon their longitudinal axes, substantially as described.

2. In a cotton-picking machine, the combination of picking devices consisting of a cord attached at one end to a shaft, B, tension-spring G, and wheel F, and at the other end in a suitable bearing in the frame E, substantially as described.

GERARD BEEKMAN.

In presence of—
C. WYLLYS BETTS,
THOMAS HUNT.